United States Patent [19]

Fletterick et al.

[11] 4,378,218
[45] Mar. 29, 1983

[54] PROTEIN MOLECULE MODEL

[76] Inventors: Robert J. Fletterick, 15 Christopher Dr., San Francisco, Calif. 94131; Bruce Argetsinger, 45 Prospect Hill Rd., Stoney Creek, Conn. 06405; Raymond Matela, 100 St. Dunstans, Coffee Hall, Milton Keynes, Bucks., England

[21] Appl. No.: 293,385

[22] Filed: Aug. 17, 1981

[51] Int. Cl.³ .............................................. G09B 23/24
[52] U.S. Cl. ...................................... 434/279; 434/72
[58] Field of Search ...................... 434/72, 73, 80, 277, 434/278, 279, 280, 281

[56] References Cited

U.S. PATENT DOCUMENTS

| 2,738,584 | 3/1956 | Parker | 434/72 X |
| 3,068,574 | 12/1962 | Bieg | 434/72 X |
| 3,286,339 | 11/1966 | Kennard | 434/278 X |
| 3,841,001 | 10/1974 | Nicholson | 434/278 |
| 4,325,698 | 4/1982 | Darling | 434/278 |

FOREIGN PATENT DOCUMENTS 1396558  6/1975  United Kingdom ................. 434/72

Primary Examiner—Harland S. Skogquist
Attorney, Agent, or Firm—Flehr, Hohbach, Test, Albritton & Herbert

[57] ABSTRACT

A ball-and-stick model system representing alpha carbon positions and the peptide link between adjacent alpha carbons as modeling elements of two-piece sets. Each two-piece set comprises complementary ring rods and ball rods, the latter having a generally cylindrical body enlarged at one end to a sphere form with a slot through a portion of the enlargement. The ring rod also includes a generally cylindrical body with an enlarged end portion to fit snugly within the slot of the ball rod so that when they are fitted together they appear as a sphere with the cylindrical body portions extending outwardly therefrom. The cylindrical portions of adjacent model sets are united by a pintle and hole structure configured so that when fitted together a continuous cylindrical body extends between adjacent spheres. Scales and indices are arranged on the adjacent surfaces of the rod and ball elements to mark the angles or bend and torsion of consecutive amino acids in the molecule and the sets are color coded to identify particular amino acids in the molecule.

6 Claims, 9 Drawing Figures

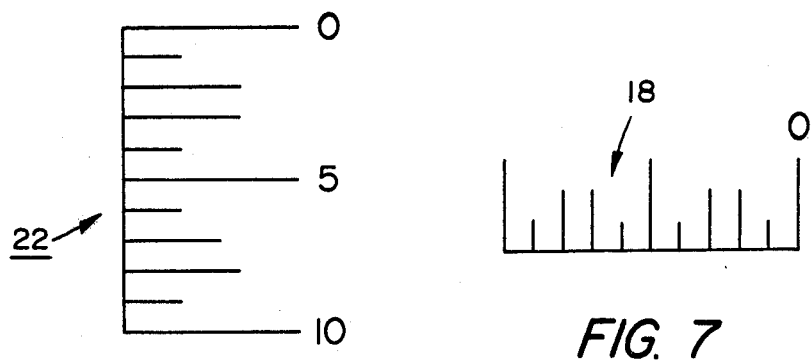
FIG. 6
FIG. 7
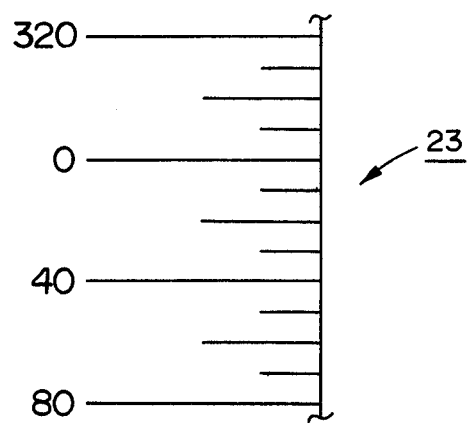
FIG. 8
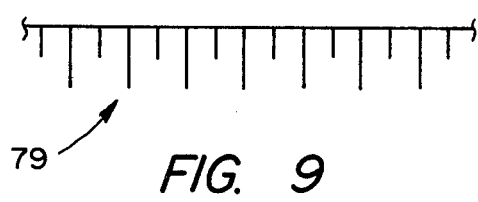
FIG. 9

PROTEIN MOLECULE MODEL

This invention concerns the modeling of proteins and more specifically relates to an improved "ball-and-stick" modeling system.

The protein model is a physical representation of a real molecule in biology and may consist of all-atom representation or a group representation of the constituent amino acids forming that molecule. The value of protein models is well understood in the field of biochemistry as shown, for example, by the 1961 award of a Nobel Prize to Max Perutz for his working out the structure of the hemoglobin protein in blood and from this discovery we now understand how sickle cell hemoglobin is disfunctional and drugs were designed to treat patients with this disorder.

Since 1961 over 200 protein structures have been worked out in laboratories around the world. In each of these laboratories a model of the protein structure was required. Further, in any laboratory which studies proteins from this group of 200, it is necessary to have a physical model of the protein. There are two procedures to make models, first being simulation by computer and the second being a physical model. With respect to the computer generated model, irrespective of the sensitivity of the graphic system employed, it still is considered inferior to having an actual physical model available to study. But in either case, the data for constructing a protein model is developed by X-ray crystallography which gives the graphic X-Y-Z coordinates of all the atoms in the molecule structure.

Among the physical modeling systems used in the field is the Watson-Kendrew modeling system which employs an all-atom representation with scale or spacings at two centimeters per angstrom. This modeling system is non-color coded and uses brass wires to show the actual atomic positions within the model. It is recognized that this modeling system is extraordinarily tedious to use and models are infrequently constructed with the Watson-Kendrew system. Another modeling system was disclosed by Herman Watson involving an X-Y-Z model which may be described generally as a forest of wires ["Z" coordinate] projecting upwardly from an X-Y base. On top of each wire was placed a ball, each representing an atom in the model. While useful for visualizing the molecule, such models were hazardous to the hands during construction and, except for very small molecules, are no longer used.

Perhaps the most commonly used system today for modeling proteins is the Nicholson molecular models available through LAPQUIP, Ashridgewood Place, Forest Road, Wokingham, Reading RG11 5RA, England. See U.S. Pat. No. 3,841,001. This system is an all-atom representation with fixed geometry except for torsional angles. Kits for using the Nicholson system include a base, rods for mounting and supporting the atoms, and the constituent units which are many and various in configuration and colors for carrying forward the ball-and-stick construction. Although elegant in concept, a model of the Nicholson system is visually complex after it is assembled and it is indeed tedious to construct because it represents every atom in the molecule. Additionally, a model formed with the Nicholson system is fixed to a base which makes it impractical to examine, rotate and study from possibly more interesting angles which would enhance the information to be gained from having the model available. The Nicholson system also contains a color coding system for identifying atom types or group types all arranged in X-Y-Z space.

As contrasted to representing a molecule as a physical molecule in X-Y-Z space, Jane Richardson and Byron Rubin disclosed that a more practical way of looking at molecular structures was to form a model of all wire construction using the bend and rotational angles between components (Rubin, B. and Richardson, J., Biopolymers III, 2313-2318 (1972)). They disclosed that instead of representing each atom in the molecule, it was necessary to represent in the model only the alpha carbon or amino acid constituents of the molecule. This system is in contrast to the ball-and-stick modeling system because it is an all wire model made using a machine with which to measure, bend and rotate eighth inch diameter wire to represent alpha carbon positions in a protein molecule. While much simplified over the prior modeling systems, and superior because of inclusion of rotational angles, the Richardson-Rubin system is difficult to model with because of inaccuracies in the bending process and the need for the specially constructed machine. In addition, that system does not represent the amino acid type, just its position in the molecule; nor does it include color coding of its components. And it is not possible with this system to add on the significant side chains desired for studying the structure and function of the protein. A well understood deficiency of almost all prior modeling systems was that the models were difficult to correct for discrepancies and were awkward to handle and transport.

In summary, the invention resides in a three dimensional physical model of a protein molecule formed of ball-and-stick construction so as to represent the relative orientation in the molecule of the constituent amino acids contained in the molecule, the improvement being that portions of the model are made from ball-and-stick elements which are relatively movable along at least two angularly related axes. Means are supplied on such elements to form scales and indices to mark the angle of bend and the angle of torsion of the consecutive amino acids in the molecule.

An object of this invention is to provide an improved modeling system for molecules which may be formed from highly simplified elements precision molded from plastic materials and joinable together with but few hand tools.

Another object of the invention is to provide a highly improved model system for proteins which is accurate in positioning the atoms or the amino acids both as to rotational or dihedral and bend angles.

Another object of the invention is to provide an improved modeling system of protein molecules which is visually simple to perceive and to glean information from, which is correctable without substantial disassembly of the model, and which is light, durable and portable for examination.

Another object of the invention is to provide a protein modeling system of the type described which is adaptable for adding portions of the molecule in an all-atom representation such as Nicholson models for side chains.

Another object is to provide an improved modeling system for proteins which may be assembled by relatively unskilled and unknowledgeable persons wherein it is feasible for such persons to assemble a model of myoglobin. As such, it can be seen that the modeling system is an instructional tool with the assembly process being a learning experience for the student in biochemistry.

Other objects of the invention become apparent from the following drawings taken in connection with the description of the preferred embodiment.

FIG. 1 of the drawings is an enlarged perspective view of a portion of an alpha helix model using components of the present invention;

FIG. 6 is a greatly enlarged view of the vernier from the cylindrical portion of the ball-rod;

FIG. 7 is in the scale of FIG. 6 and illustrates the vernier from the spherical portion of the ball-rod;

FIG. 8 is in the scale of FIG. 6 and illustrates the vernier from the cylindrical portion of the ring-rod; and FIG. 9 is in the scale of FIG. 6 and illustrates the vernier from the ring portion or spherical portion at the end of the ring-rod.

Figure 1:
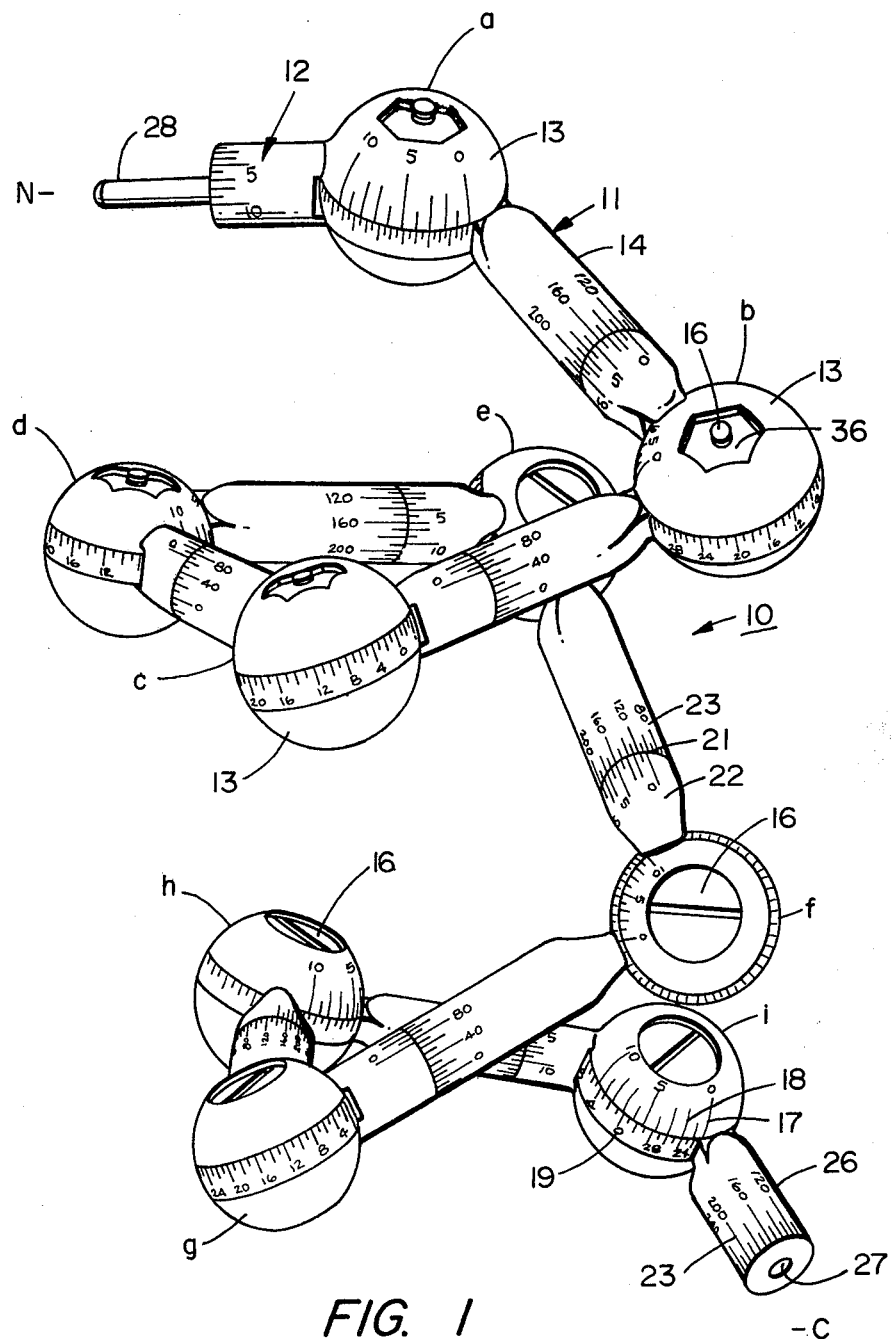

A preferred embodiment of the invention is shown in the drawings and referring particularly to FIG. 1, there is shown a piece 10 of an alpha helix made up from nine 2 piece sets of the ring-rods 11 and ball-rods 12. It will be seen that the configuration is that of the ball-and-stick representation or model system and here the balls or bulbs 13 serve to identify alpha carbon positions and therefore the amino acid at that location in the alpha helix. The stick or rod portion 14 identifies the peptide link between adjacent alpha carbons. In other words, the stick represents the peptide bonds which link the amino acids in the protein molecule. The length of the stick or rod 14 is 3.8 centimeters where each centimeter represents one angstrom unit. The diameter of the ball or spheres bulbs 13 is arbitrary, but selected as to be enlarged from the diameter of the rod portions so that the bulb is clearly visible and readily perceptible, and the scale readable. In the modeling system disclosed herein an amino acid "set" is the combination of a ring-rod 11 and ball-rod 12 assembled together and secured by a fastener 16, as illustrated in FIG. 1. This represents one amino acid. Being that there are twenty genetically determined amino acids, a color coding system has been constructed and is shown below in Table 1.

TABLE 1

| Amino Acid | Color |
|---|---|
| 1. alanine | light green |
| 2. glutamine | pink |
| 3. asparagine | light pink |
| 4. leucine | medium dark green |
| 5. glycine | white |
| 6. lysine | medium blue |
| 7. serine | light orange |
| 8. valine | medium green |
| 9. argine | dark blue |
| 10. threonine | orange |
| 11. proline | grey |
| 12. isoleucine | dark green |
| 13. methionine | light yellow |
| 14. phenylalanine | medium brown |
| 15. tyrosine | light brown |
| 16. cysteine | yellow |
| 17. tryptophan | dark brown |
| 18. histidine | light blue |
| 19. glutamic acid | medium red |
| 20. aspartic acid | light red |

It will be seen from FIG. 1 that the nine amino acids illustrated there have been identified with alphabetic letters a through i. Although not illustrated in FIG. 1 as to color, if we assume that colors from Table 1 are applied to represent the nine amino acids, numbers 299 to 307 of carboxypeptidase, the colors reading from N to C ends would be as follows: orange, dark green, light yellow, red, light blue, orange, green, light pink, light pink. It will be observed that the N side is indicated at the upper left in FIG. 1 and the C side is at the lower right. However, in FIG. 1 the bend angles and rotational or dihedral angles between adjacent amino acids are depicted arbitrarily so as to illustrate all surfaces of the elements 12 and 13 and their interconnecting fasteners 16.

Bend angles and rotation angles describe how two amino acids relate to each other, their relative orientation, and referring to FIG. 1 we see that amino acid h has a bend angle with respect to amino acid i of 213° as shown at 17, this being read by the vernier as represented by vernier 18 and scale 19.

A rotation angle is shown between amino acid e and f as being 102° as indicated at location 21, this being defined by the vernier 22 and scale 23. A showing of the vernier 18 and scale 19 "in the flat" for determining the bend relationship between consecutive amino acids is given on an enlarged scale in FIGS. 7 and 9 respectively. Similarly, the vernier 22 and scale 23 for depicting the rotational angle between consecutive amino acids are shown in FIGS. 6 and 8.

Figure 4:
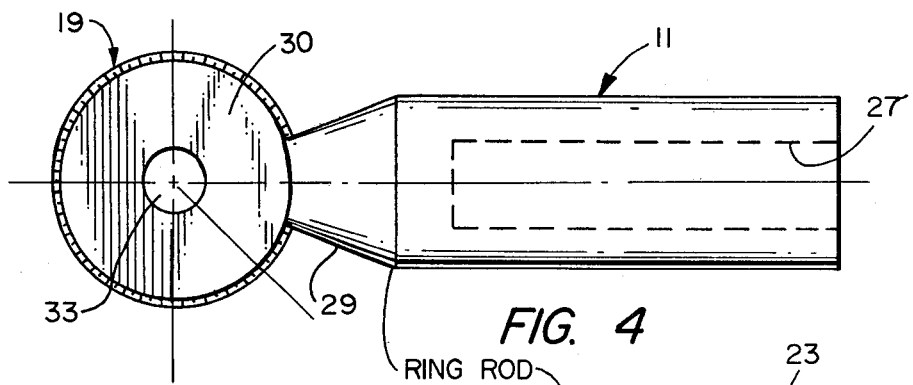
FIGS. 4 and 5 are views on the scale of FIGS. 2 and 3 of the ring-rod element of the present invention.
Figure 5:
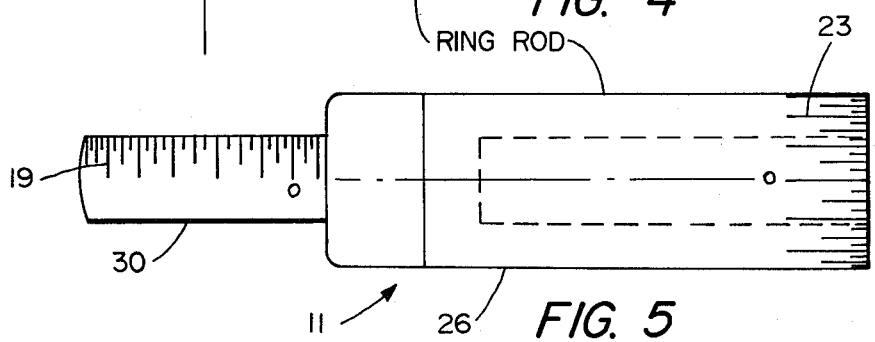

Referring now specifically to FIGS. 4 and 5, a ring-rod 11 comprises a barrel element 26, the free end of which is provided with the scale 23. A cylindrical recess 27 is arranged in the end of the barrel 26 to receive a complementary pintle 28 from the ball-rod 12. A ring-like structure 30 having a central hole 33 is arranged on the other end of the rod 11 and the periphery of the ring is embossed with the scale 19 for setting the bend relationship. The ring-like element 30 and adjacent barrel portion 26 are configured so as to provide an undercut portion 29 (FIG. 4), which permits the complementary element of the ball-rod to assume the necessary acute angle for constructing the protein model.

Figure 2:
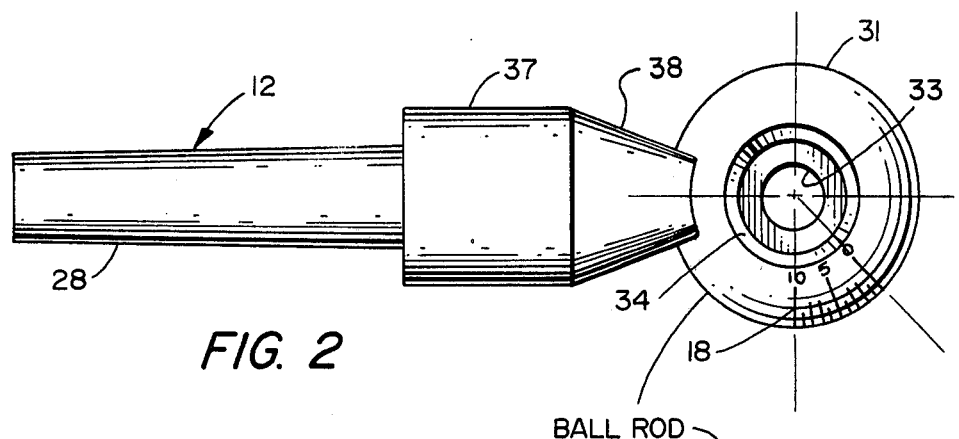
FIGS. 2 and 3 are views on a further enlarged scale of the ball-rod element of the present invention.
Figure 3:
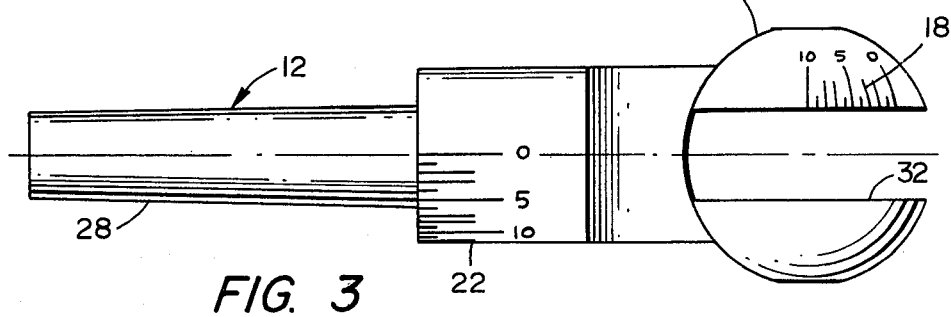

Referring to the ball-rod 12 as shown in FIGS. 2 and 3, a bulbous element 31, preferably spherical in shape, is provided with a slot 32, FIG. 3, of a width for receiving the ring like element 30. The outer contour of the ring element 30 matches that of the ball element 31 so that when the parts are united as shown in FIG. 1, the visual impression is that of a bulbous sphere. As may be seen from FIGS. 2 and 4, both the ball element 31 and ring element 28 are provided with a coaxially arranged hole 33 for receiving the fastener 16 so as to hold the elements 11 and 12 in the selected angular relationship. Further, each face of the ball element 31 is provided with a recess 34 of suitable configuration for receiving the fastener 16 which preferably is a standard flathead screw with a hex nut 36, FIG. 1.

A body section 37 of the ball-rod 12 is cylindrical in form, has the same diameter as, but is shorter than the barrel 26. The body section 37 receives the vernier 22, either embossed, inscribed or printed, for indicating the rotational relationship described above. A tapered portion 38 is disposed between the body portion 37 and ball element 31 to facilitate an acute angle relationship between the two elements 11 and 12, which together represent an amino acid. The pintle element 28 extends outwardly from the body portion 37 and can be either of tapered configuration to snuggly seat within the recess 27 or may be of cylindrical configuration having a bump like deformable detent, not shown, along its surface to cause a frictional fit of the pintle 28 within the recess 27. Thus, when the worker selects the proper rotational angle between consecutive amino acids in the molecule she sets the two parts together, 11a to 12b, for example, using the vernier scale 22-23. The pintle element 28 of 12b may be pressed firmly and snuggly within the recess of 11a so as to maintain that relationship on a permanent basis, 120° being shown in FIG. 1. To further enhance the bond, an adhesive material may be injected by an eye dropper or the like so as to secure the elements permanently together.

For securing together the ball portions 13 of the elements 11, 12, one places the ring 30 of rod 11 within the slot 32 of rod 12 and thereafter inserts the fastener 16 through the aligned bore 33. The parts are positioned in accordance with the selected bend angle and are established through use of the scale and vernier 19 and 18. The fastener 16 is tightened to cause frictional engagement between the parts serving to hold the elements permanently in position.

It will be seen from comparing the length of the cylindrical body portions 26 of the ring-rod 11 with the body portion 37 of the ball-rod 12, that the ring-rod has a substantially longer body portion. It will be recalled that the parts are colored to reflect the code set out in Table 1 and in constructing a protein model the preferred orientation is for the longer portion, that of the ring-rod, to project from the N-end of the molecule towards the C-end of the molecule as indicated in FIG. 1. In other words, the long portion of the ring-rod always works or projects towards the C-end of the molecule.

For constructing an accurate three dimensional representation of model of a protein, the worker who may be nonskilled and unknowledgeable in biochemistry is provided with instructions as to the sequence of the amino acids in the protein. The sequence starts at the N-end and each amino acid is identified with respect to its neighbor by the respective bend angle and torsional or rotational angle. The torsional angles and rotational angles were calculated by a special computer program that adjusts the experimental atomic coordinates so as to remove inherent errors thereby making the X-carbon and carbon distances conform to 3.8A. The color of the particular amino acid is also contained in the instructions with the colors preferably conforming to those of Table 1 above. It has been found that a worker can complete an alpha carbon model for a protein such as myoblobin in less than two hours using only a screwdriver and ordinary plastic cement in addition to the instructions mentioned above.

The worker first looks to the sequence of colors for identifying the amino acids and assembles ten to twelve amino acid units or sets 11, 12 in a straight line segment by interfitting the ball-rods and ring-rods by placing the pintles 28 within the complementary recess 27 and the ring element 30 within the slot 32 of the ball 13 and loosely holds them together with the fastener 16. Starting from the N-side of the molecule the worker selects the proper rotational angle between consecutive amino acids through use of the vernier scale at 22 and 23 on the rod 14 and then applies a small amount of adhesive to the joint in the rod to hold the parts in the preselected position. This procedure is followed until the first sets of ten to twelve amino acids are connected together through setting their rotational or dihedral angle as taken from the instructions. When a group of amino acids has been assembled together, the worker then starts from the N-side of the molecule and adjusts the bend angles between adjacent amino acids through use of the scale and vernier 18 and 19 on the ball 13 and then tightens the fastener 16 securely. It is preferable to assemble the chain of amino acids in segments and then to unite several segments together after adjusting the proper rotational and torsional angles at the barrel portions as described above. As the worker proceeds to get further along towards completion of the molecule, he consults the instructions which furnish the distances from certain amino acids to their neighbors so that the three dimensional model may be checked again to assure the correct shape. Supports may be added where required between different groups and such supports may take the shape of wire struts not shown, toothpicks or the like. No base or platform is necessary.

Through the use of this ball-and-stick system with the components as disclosed above, it is feasible to provide college undergraduates and high school students with a kit for assembling protein molecules with the kit including the instructions and the component rods 11, 12 in the several colors adopted to represent the amino acids. Side chains may be coupled to the model of this disclosure using the Nicholson modeling system mentioned above with specially adapted connectors, not shown, to provide where needed relevant side chains illustrating sites of chemical activity for the particular protein. Prosthetic groups or nonstandard side chains may be added to replicate features of the molecule being studied.

The modeling system disclosed here has on its component parts 11, 12 verniers and scales 18, 19, 22, 23 for showing the relationships between consecutive alpha carbons in a molecule which is a highly useful feature.

Models of molecules other than proteins are possible using the ring-rods 11 and ball-rods 12 by reason of the two rotational axes provided by these elements. A first or cylindrical axis is provided on the barrel or rod 14 portion by the pintle 28 and recess 27 and a second or spherical axis is provided at the ball joint between the elements 11 and 12. When a set comprising six or seven connected units are placed together with the parts in a simple frictional engagement permitting relative motion between them, it is possible to achieve both flat and distorted configurations not otherwise available with other modeling systems. Thus, the parts 11, 12, 16 may be used in either the fixed state or in a semi-loose state where it is desired to illustrate other chemical principles and relationships.

It will be apparent from above there has been described an improved modeling system of the ball-and-stick type which is simple in design, inexpensive to fabricate for assembling into protein models and which fulfills the objects specified above.

What is claimed is:

1. In a three dimensional physical model of a protein molecule formed of ball-and-stick construction to represent the relative position of a plurality of constituent amino acids of such molecule, the improvement wherein portions of the model are made from interconnected ball-and-stick components which are relatively movable during assembly along at least two angularly related axes, and means on said components adjacent to the connections forming scales and indices serving to mark the angle of bend and the angle of torsion of consecutive amino acids in the molecule.

2. An improved three dimensional molecular model wherein the consecutive constituent amino acids or alpha carbon components or the like may be related directly to one another without reference to X-Y-Z locational data, comprising a plurality of first and second members, said members being joinable at one end to define an enlarged portion serving to symbolize an alpha carbon and joinable at their other ends to define a rod like element symbolizing a peptide bond between two adjacent alpha carbons, and scale means arranged along the joining portions of said members so each the enlarged portion and the rod like element may be angularly related for establishing the relative bond and rotational position of consecutive components within the molecule.

3. The model of claim 2 wherein ones of said first and second members joined together are color coded serving to identify particular amino acids.

4. The three dimensional molecular model as recited in claim 2 wherein at least one of said first members includes a generally cylindrical body having at one end an enlarged portion of generally spherical form, said enlarged portion having a slot therethrough with spaced parallel sidewalls extending generally parallel to the axis of said body, and wherein at least one of said second members includes a generally cylindrical body having at one end an enlarged portion of generally cylindrical form, said enlarged portion being sized for snug receipt in said slot, the enlarged portions of said first and second members being configured so that when they are fitted together they appear as a sphere with said cylindrical body portions extending outwardly therefrom, and fastener means serving to maintain said enlarged portions in the selected relationship to each other.

5. The three dimensional molecular model as recited in claim 2 wherein said cylindrical body of one of said members includes an axially extending pintle and the body of the other member includes a hole complementary to said pintle, the body portions of said first and second members being configured so that when they are fitted together with the pintle in the hole they appear as a cylinder with one of said enlarged portions at each end thereof, and means acting between the engaged portions of said members serving to retain said pintle in said hole in the relationship selected between said members.

6. The three dimensional molecular model as recited in claim 5 wherein the exposed body portion of the member having said pintle is axially shorter than the exposed body portion of the member having said hole, and wherein said first and second members are color coded serving to identify particular amino acids so that when said first and second members of different colors are fitted together the longest exposed cylindrical portion indicates the direction of the series of amino acids from the N side to the C side of the molecule.

* * * * *